US012291991B1

(12) United States Patent
Barberger et al.

(10) Patent No.: US 12,291,991 B1
(45) Date of Patent: *May 6, 2025

(54) HOUSING ASSEMBLY FOR ROTARY ENGINE

(71) Applicant: PRATT & WHITNEY CANADA CORP., Longueuil (CA)

(72) Inventors: Jeremie Barberger, Montreal (CA); Vincent Savaria, Laval (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/539,874

(22) Filed: Dec. 14, 2023

(51) Int. Cl.
*F02B 55/08* (2006.01)
*B33Y 10/00* (2015.01)
*F02B 53/00* (2006.01)

(52) U.S. Cl.
CPC .............. *F02B 55/08* (2013.01); *B33Y 10/00* (2014.12); *F02B 2053/005* (2013.01); *F05C 2201/021* (2013.01); *F05C 2201/0448* (2013.01); *F05C 2211/00* (2013.01); *F05C 2253/12* (2013.01)

(58) Field of Classification Search
CPC .... F02B 55/08; F02B 2053/005; F01C 19/00; F01C 1/22; F01C 21/104
USPC ......... 277/357; 123/18 A, 18 R, 43 A, 45 A, 123/45 R, 200–249; 418/140, 187, 61.1; 60/39.55

See application file for complete search history.

(56) References Cited

U.S. PATENT DOCUMENTS

| | | | | |
|---|---|---|---|---|
| 3,289,649 A | * | 12/1966 | Lamm ..................... | F02B 55/08 123/193.2 |
| 3,393,667 A | * | 7/1968 | Jones ...................... | F02B 53/12 123/205 |
| 3,705,818 A | * | 12/1972 | Grosseau ................ | F02B 53/00 205/183 |
| 3,706,514 A | * | 12/1972 | Ruf .......................... | F16J 15/34 418/104 |
| 3,799,706 A | | 3/1974 | Bilobran | |
| 3,820,513 A | * | 6/1974 | Buettner ................. | F02B 53/00 123/229 |
| 3,833,320 A | * | 9/1974 | Telang ................... | F01C 19/005 418/178 |
| 3,833,321 A | * | 9/1974 | Telang .................... | B23P 15/00 418/178 |
| 3,837,320 A | * | 9/1974 | Maekawa ............... | F02B 55/08 418/149 |

(Continued)

*Primary Examiner* — J. Todd Newton
(74) *Attorney, Agent, or Firm* — NORTON ROSE FULBRIGHT CANADA LLP

(57) ABSTRACT

A housing assembly for a rotary engine, has: a rotor housing having a peripheral inner face, a first face and a second face; a first side defining a first inner side face; and a second side housing defining a second inner side face, the rotor cavity bounded between the first side housing and the second side housing, one or more of the rotor housing, the first side housing, and the second side housing having: a main body made of a base material; and an external layer made of an external material, the base material and the external material being dissimilar to one another, a wear-resistance of the external material greater than that of the base material, the external layer defining at least a part of one or more of the first face, the second face, the peripheral inner face, the first inner side face, and the second inner side face.

18 Claims, 9 Drawing Sheets

(56) References Cited

U.S. PATENT DOCUMENTS

| | | | | |
|---|---|---|---|---|
| 3,918,137 | A * | 11/1975 | Telang | F01C 21/104 |
| | | | | 29/527.3 |
| 3,970,527 | A * | 7/1976 | Brown | C25D 1/00 |
| | | | | 29/527.3 |
| 3,981,688 | A * | 9/1976 | Telang | F02B 55/00 |
| | | | | 29/527.3 |
| 4,058,321 | A * | 11/1977 | Gavrun | F16J 15/3452 |
| | | | | 277/357 |
| 4,633,829 | A | 1/1987 | Kollen | |
| 4,758,139 | A * | 7/1988 | Yagii | F01C 21/104 |
| | | | | 29/888.012 |
| 9,896,934 | B2 | 2/2018 | Villeneuve et al. | |
| 11,333,068 | B1 * | 5/2022 | Savaria | F01C 1/22 |
| 11,499,550 | B2 * | 11/2022 | Montie | F04C 2/1073 |
| 11,506,056 | B2 * | 11/2022 | Montie | F01C 21/08 |
| 11,761,376 | B1 * | 9/2023 | Vinski | F01C 1/22 |
| | | | | 123/200 |
| 2015/0044084 | A1 * | 2/2015 | Hofmann | B05D 1/18 |
| | | | | 264/642 |
| 2018/0339338 | A1 * | 11/2018 | Hofmann | B22F 10/34 |
| 2020/0200009 | A1 * | 6/2020 | Gagnon-Martin | F01C 19/10 |
| 2022/0203456 | A1 * | 6/2022 | Chen | B22F 10/50 |
| 2022/0324029 | A1 * | 10/2022 | Yavas | B33Y 30/00 |

\* cited by examiner

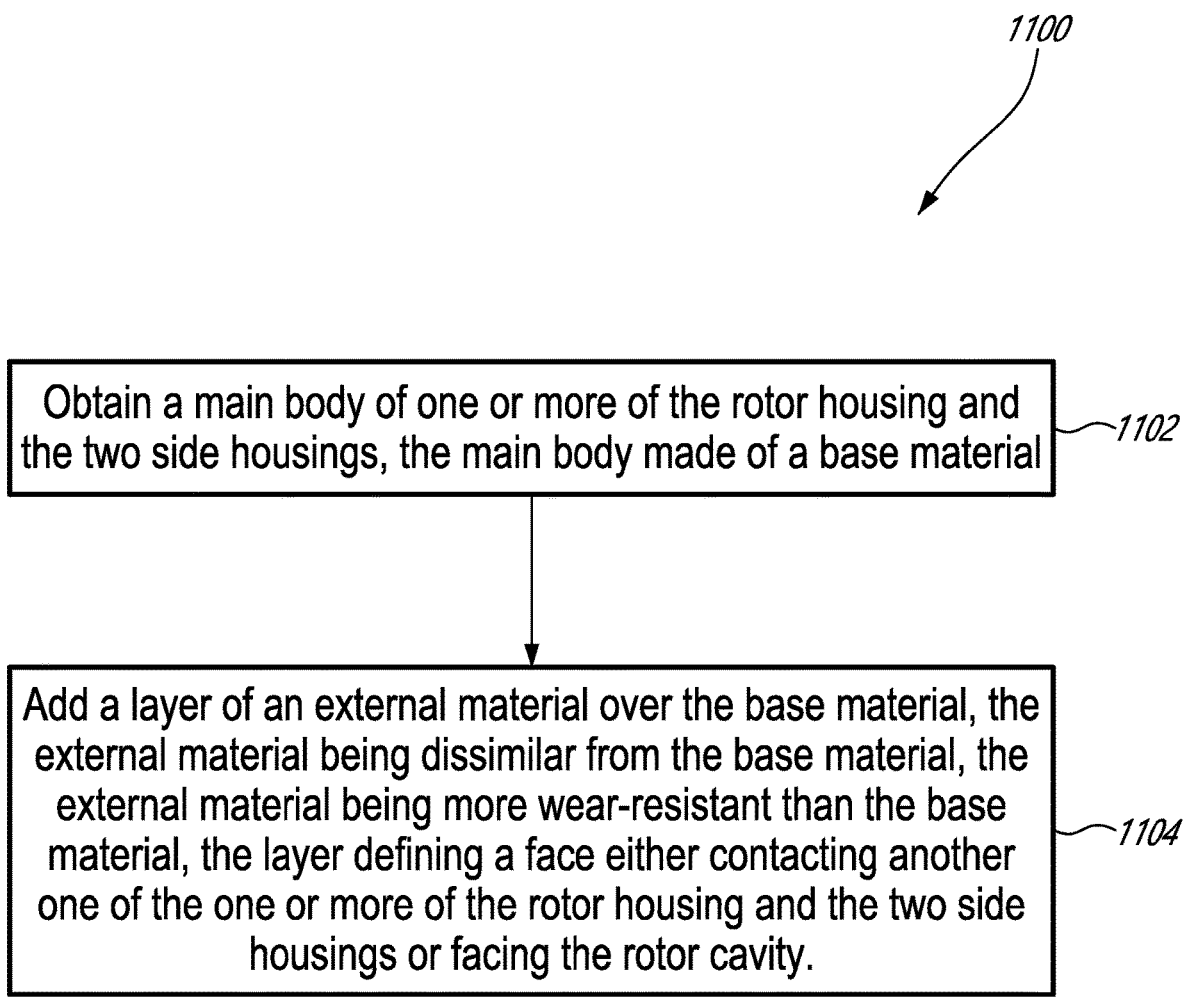

HOUSING ASSEMBLY FOR ROTARY ENGINE

TECHNICAL FIELD

The application relates generally to aircraft engine and, more particularly, to rotary internal combustion engines and for housings thereof.

BACKGROUND

Combustion chambers of a rotary engine, such as a Wankel engine, are delimited radially by the rotor and rotor housing and axially by side housings. The side housings have faces oriented toward the combustion chambers and are thus subjected to high pressure and thermal loads. On the other hand, the side housings provide running surfaces for side seals of the rotor. Improvements are always desirable in this technology area.

SUMMARY

In one aspect, there is provide a housing assembly for a rotary internal combustion engine, comprising: a rotor housing extending around an axis, the rotor housing having a peripheral inner face facing a rotor cavity, a first face at a first side and a second face at a second side opposite to the first side; a first side housing secured to the first side of the rotor housing, the first side housing defining a first inner side face facing the rotor cavity and the rotor housing; and a second side housing secured to the second side of the rotor housing, the second side housing defining a second inner side face facing the rotor cavity and the rotor housing, the rotor cavity bounded axially between the first side housing and the second side housing, one or more of the rotor housing, the first side housing, and the second side housing having: a main body made of a base material; and an external layer made of an external material, the base material and the external material being dissimilar to one another, a wear-resistance of the external material greater than that of the base material, the external layer defining at least a part of one or more of the first face of the rotor housing, the second face of the rotor housing, the peripheral inner face of the rotor housing, the first inner side face of the first side housing, and the second inner side face of the second side housing.

The housing assembly described above may include any of the following features, in any combinations.

In some embodiments, the base material is aluminum and the external material is steel.

In some embodiments, a thickness of the external layer is at least about 0.003 inch.

In some embodiments, a coating is disposed over the external layer.

In some embodiments, the coating includes of one or more of silicon carbide, chromium carbide, aluminum nitride, and tungsten carbide.

In some embodiments, the first side housing includes a side wall secured to the rotor housing and a side plate, a peripheral section of the side plate disposed between the side wall and the rotor housing.

In some embodiments, the side plate is made of silicon carbide, the first inner side face extending around the side plate and abutting the first face of the rotor housing.

In some embodiments, both of the first inner side face and the first face are defined by the external material.

In some embodiments, the side plate has a side plate main body made of the base material and a side plate external layer made of the external material.

In some embodiments, a coating is disposed over the side plate external layer.

In another aspect, there is provided a rotary internal combustion engine including the housing assembly described above and a rotor received within the rotor cavity.

In yet another aspect, there is provided a method of manufacturing a housing assembly for a rotary internal combustion engine, the housing assembly having a rotor housing and two side housings secured to the rotor housing to define a rotor cavity, the method comprising: obtaining a main body of one or more of the rotor housing and the two side housings, the main body made of a base material; and adding a layer of an external material over the base material, the external material being dissimilar from the base material, the external material being more wear-resistant than the base material, the layer defining a face either contacting another one of the one or more of the rotor housing and the two side housings or facing the rotor cavity.

The method described above may include any of the following features, in any combinations.

In some embodiments, the base material is aluminum and the external material is steel, the adding of the layer of the external material includes adding the steel over the aluminum.

In some embodiments, the adding of the external material includes adding the external material to the base material via ultrasonic additive manufacturing.

In some embodiments, the method includes adding a coating over the external layer.

In some embodiments, the adding of the coating includes adding a coating of one or more of silicon carbide, chromium carbide, aluminum nitride, and tungsten carbide, over the external layer.

In some embodiments, the method includes applying a surface treatment to the external layer.

In some embodiments, the applying of the surface treatment includes performing one or more of laser hardening, shot peening, and thermal spraying.

In some embodiments, the obtaining of the main body includes obtaining a side housing of the two side housings, the side housing including a side wall secured to the rotor housing and a side plate, a peripheral section of the side plate disposed between the side wall and the rotor housing.

In some embodiments, the adding of the external layer includes adding the external layer on the side plate.

BRIEF DESCRIPTION OF THE DRAWINGS

Reference is now made to the accompanying figures in which:

FIG. 11 is a flowchart illustrating steps of a method of manufacturing a housing assembly for the rotary engine of FIG. 1.

DETAILED DESCRIPTION

Figure 1:
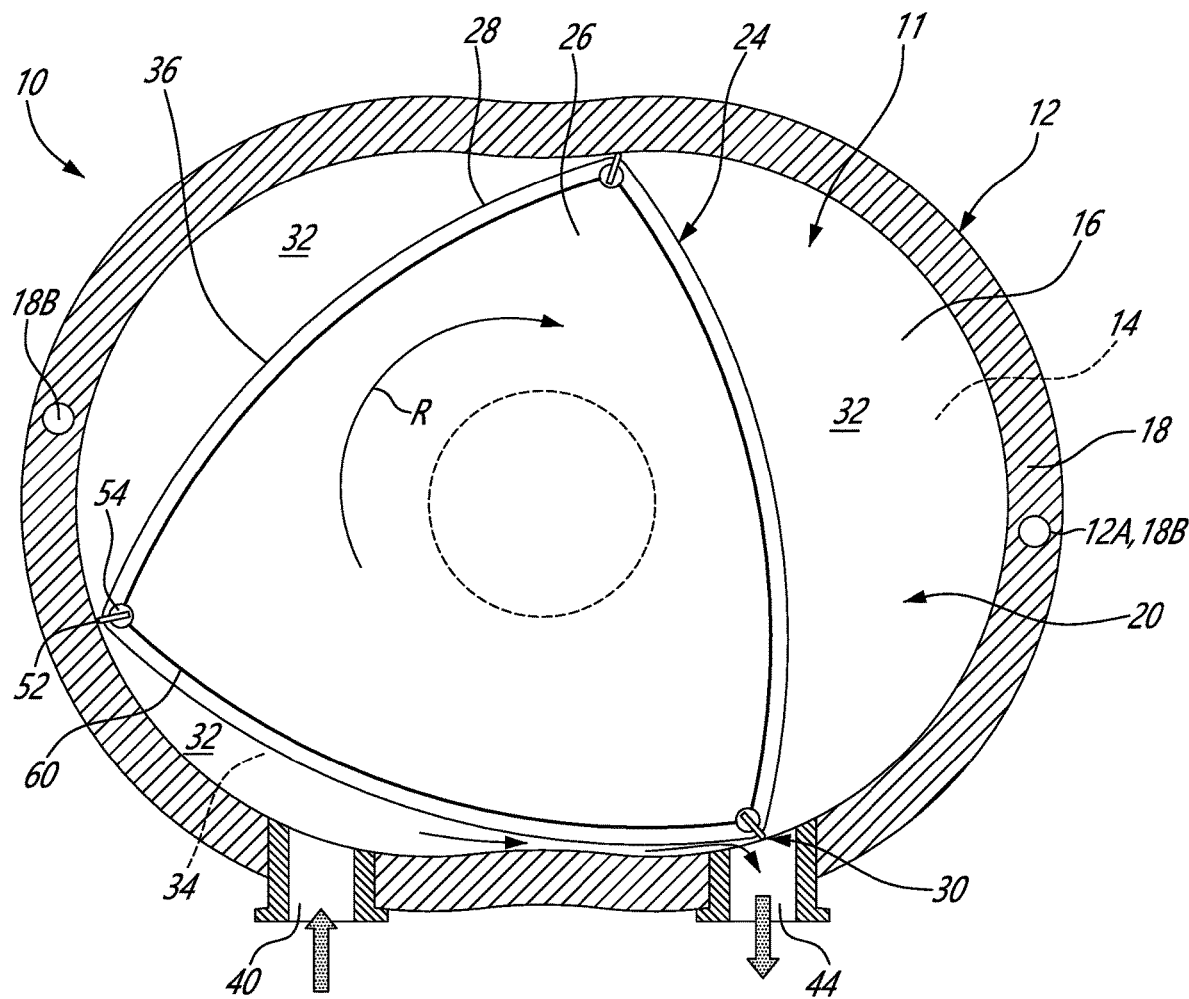
FIG. 1 is a cross-sectional view of a rotary internal combustion engine in accordance with one embodiment.

Referring to FIG. 1, a rotary internal combustion engine, referred to simply as a rotary engine below, which may be a Wankel engine, is schematically shown at 10. The rotary engine 10 comprises an outer body also referred to as a housing assembly 12 having axially-spaced side housings 11, which each includes a side wall 14 and a side plate 16 mounted to the side wall 14, with a rotor housing 18 extending from one of the side housings 11 to the other, to form a rotor cavity 20. The rotor housing 18 has a first side and a second side opposite to the first side. The side housings 11 include a first side housing secured to the first side and a second side housing secured to the second side. The rotor cavity 20 is defined axially between the side housings 11 and circumscribed by the rotor housing 18. In FIG. 1, the side wall 14 is indicated with a dashed line because it sits below the side plate 16. The inner surface of the rotor housing 18 has a profile defining two lobes, which may be an epitrochoid. In some alternate embodiments, the side housings 11 include solely the side wall, that is, the side wall and the side plate may be combined into a single element. In alternative embodiments, the side housings 11 may each include solely a wall secured to a respective side of the rotor housing 18. This wall would define both of abutment faces contacting the rotor housing 18 and running faces contacting a rotor in the rotor cavity 20.

In some embodiments, the housing assembly 12 of the rotary engine 10 may include an intermediate housing in a configuration in which the rotary engine 10 includes two rotors and two rotor housings. The side housings, as intended in this disclosure, may be embodied as end housing or as intermediate housing. Put differently, in a rotary engine including a plurality of rotors, the rotary engine includes a stack of housings. For instance, for a 2-rotor engine, the stack of housing includes: a first end housing, a first rotor housing, an intermediate housing, a second rotor housing, and a second end housing. In such a configuration, each of the first and second rotor housings is disposed between a respective one of the first and second end housings and the intermediate housing. Regardless of a number of rotors, the rotary engine includes only two end housings disposed at opposite ends of the stack of housings. A number of the intermediate housing equals a number of the rotor minus 1 (e.g., one intermediate housing for a two-rotor engine, two intermediate housings for a three-rotor engine, and so on). The different housings are clamped in sandwich. The intermediate housing may include a wall and two side plates.

The housing assembly 12 includes a coolant circuit 12A, which may include a plurality of coolant conduits 18B defined within the rotor housing 18. As shown more clearly in FIG. 5, the coolant conduits 18B extends from one of the side housings 11 to the other. The coolant circuit 12A is used for circulating a coolant, such as water or any suitable coolant, to cool the housing assembly 12 during operation of the rotary engine 10. Although only two coolant conduits 18B are shown, it is understood that more than two coolant conduits 18B may be used without departing from the scope of the present disclosure.

An inner body or rotor 24 is received within the rotor cavity 20. The rotor 24 has axially spaced end faces 26 adjacent to the side walls 14, and a peripheral face 28 extending there between. The peripheral face 28 defines three circumferentially-spaced apex portions 30, and a generally triangular profile with outwardly arched sides 36. The apex portions 30 are in sealing engagement with the inner surface of rotor housing 18 to form three rotating combustion chambers 32 between the rotor 24 and housing assembly 12. The combustion chambers 32 vary in volume with rotation of the rotor 24 within the housing assembly 12. The geometrical axis of the rotor 24 is offset from and parallel to the axis of the housing assembly 12. In some embodiments, more or less than three rotating combustion chambers may be provided with other shapes of the rotor.

The combustion chambers 32 are sealed. In the embodiment shown, each rotor apex portion 30 has an apex seal 52 extending from one end face 26 to the other and biased radially outwardly against the rotor housing 18. An end seal 54 engages each end of each apex seal 52 and is biased against the respective side wall 14. Each end face 26 of the rotor 24 has at least one arc-shaped face seal 60 running from each apex portion 30 to each adjacent apex portion 30, adjacent to but inwardly of the rotor periphery throughout its length, in sealing engagement with the end seal 54 adjacent each end thereof and biased into sealing engagement with the adjacent side plates 16 of the side housings 11. Alternate sealing arrangements are also possible.

Although not shown in the Figures, the rotor 24 is journaled on an eccentric portion of a shaft such that the shaft rotates the rotor 24 to perform orbital revolutions within the rotor cavity 20. The shaft may rotate three times for each complete rotation of the rotor 24 as it moves around the rotor cavity 20. Oil seals are provided around the eccentric to impede leakage flow of lubricating oil radially outwardly thereof between the respective rotor end face 26 and side housings 11. During each rotation of the rotor 24, each chamber 32 varies in volumes and moves around the rotor cavity 20 to undergo the four phases of intake, compression, expansion and exhaust, these phases being similar to the strokes in a reciprocating-type internal combustion engine having a four-stroke cycle.

The engine includes a primary inlet port 40 in communication with a source of air and an exhaust port 44 In the embodiment shown, the ports 40, 44 are defined in the rotor housing 18. Alternate configurations are possible.

In a particular embodiment, fuel such as kerosene (jet fuel) or other suitable fuel is delivered into the chamber 32 through a fuel port (not shown) such that the chamber 32 is stratified with a rich fuel-air mixture near the ignition source and a leaner mixture elsewhere, and the fuel-air mixture may be ignited within the housing using any suitable ignition system known in the art (e.g. spark plug, glow plug). In a particular embodiment, the rotary engine 10 operates under the principle of the Miller or Atkinson cycle, with its compression ratio lower than its expansion ratio, through appropriate relative location of the primary inlet port 40 and exhaust port 44.

Referring now to FIGS. 2-5, one of two side housings 11 of the housing assembly 12 is illustrated. As briefly introduced above, the side housings 11 include the side walls 14 that are secured to the rotor housing 18. Each of the side walls 14 has a portion located proximate an outer perimeter P (FIG. 4) of the side wall 14 and configured to be in abutment against the rotor housing 18 for defining the rotor cavity 20.

In the embodiment shown, each of the side walls 14 is configured to be secured to a respective one of opposed ends of the rotor housing 18. The side housings 11 further include side plates 16 located on inner sides of the side walls 14. The side plates 16 define rotor-engaging faces 16A on which the side seals 60, oil seals, and the corner seals 54 of the rotor 24 are in abutment during rotation of the rotor 24. The side plates 16 further define back faces opposite the rotor-engaging faces 16A. The back faces of the side plates 16 face the side walls 14.

The side walls 14 may be made of aluminum, more specifically an aluminum alloy, due to its light weight and high thermal conductivity. However, it may be required that the surfaces of the side walls 14 in contact with the seals 54, 60 be coated to provide a wear-resistance surface. In the embodiment shown, the side plates 16 are made of aluminum and coated with a hard material such as silicon carbide, aluminum nitride, chromium carbide, tungsten carbide, and so on. Any suitable wear resistant coating applied by thermal spray or any other suitable method may be used. The side walls 14 and the side plates 16 will be described in more details below. Although the text below uses the singular form, the description may be applied to both of the side walls 14 and to both of the side plates 16. The side plates 16 may however be entirely made of the hard material, such as silicon carbide. The side plates 16 may be made of aluminum, steel, or any suitable ceramic material.

Figure 4:
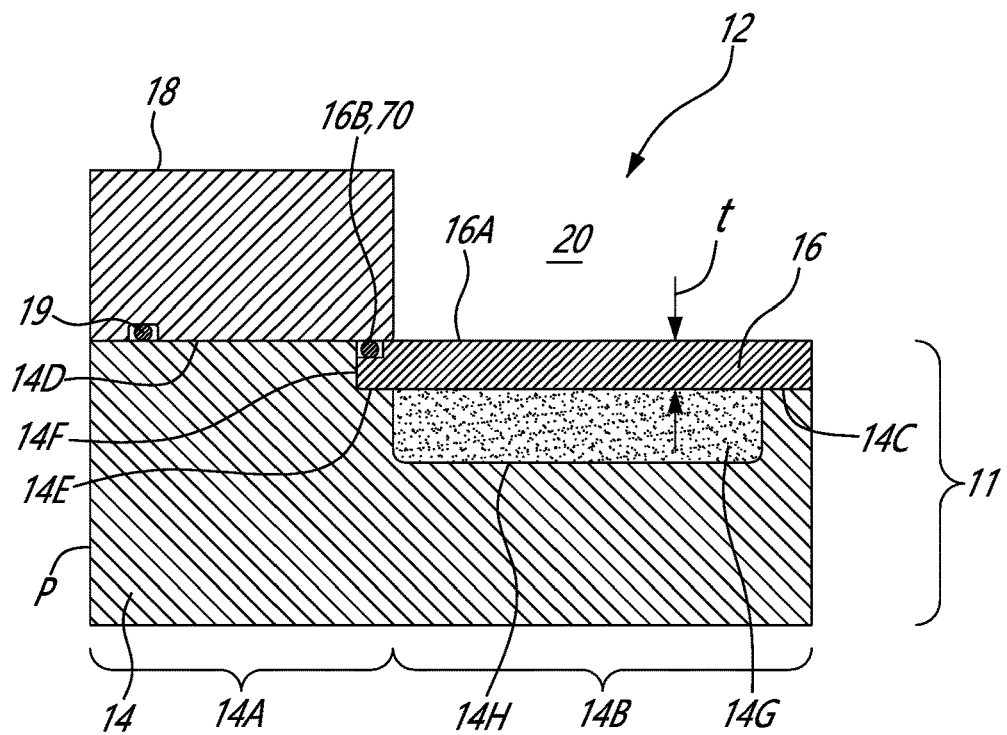
FIG. 4 is a cross-sectional view taken along line B-B of FIG. 2 in accordance with one embodiment.

Referring more particularly to FIG. 4, the side wall 14 includes a peripheral section 14A, which is in abutment with the rotor housing 18, and a center section 14B, which is circumferentially surrounded by the peripheral section 14A. In the disclosed embodiment, the peripheral section 14A of the side wall 14 is secured to the rotor housing 18. The center section 14B of one of the side walls 14 faces the center section 14B of the other of the side walls 14. The side walls 14 are secured to the rotor housing 18 with any suitable means known in the art. As shown, a sealing member 19 is located between the rotor housing 18 and the peripheral sections 14A of the side walls 14 for preventing coolant from leaking out. The sealing member 19 may be an O-ring. The sealing member 19 may be received within an annular recess, which may be defined by one or more of the rotor housing 18 and the side wall 14.

The side wall 14 defines a recess 14C for receiving the side plate 16. The peripheral section 14A of the side wall 14 extends from the outer perimeter P to the recess 14C. As shown, a surface 14D of the peripheral section 14A of the side wall 14 that faces the rotor housing 18 is axially offset from a surface 14E of the center section 14B of the side wall 14. A magnitude of the offset corresponds to a depth of the recess 14C and may correspond to a thickness t of the side plate 16 plus any axial gap defined between a rotor-engaging face of the side plate 16 and the rotor housing 18. The side plate 16 is therefore in abutment with the surface 14E of the center section 14B of the side wall 14. In other words, a sealing surface of the side plate 16, located on a side of the side plate 16 that faces the rotor cavity, may be aligned with the peripheral section 14A of the side wall 14.

The side wall 14 defines an abutment surface 14F. The abutment surface 14F is defined by a shoulder created by the offset of the surfaces 14D, 14E of the peripheral and central sections 14A, 14B of the side wall 14. The side wall 14, via its abutment surface 14F, limits radial movements of the side plate 16 relative to the axis of rotation of the rotor 24. The side plate 16 may be supported by a housing in the center to limit the movement of the side plate 16.

In a particular embodiment, a gap may remain between a peripheral section of the side plate 16 and the abutment surface 14F of the side wall 14. In other words, and in the embodiment shown, the side plate 16 may be spaced apart from the abutment surface 14F. A size of the gap may change during operation of the rotary engine 10 as the side wall 14 and the side plate 16 may expand at different rates with an increase of a temperature in the rotor cavity 20. In other words, the space between the side plate 16 and the abutment surface 14F of the side wall 14 may allow relative thermal expansion between the side plate 16 and the side wall 14 so that thermal stress transferred from the side plate 16 to the rotor housing 18 and the side wall 14 might be minimized.

To limit axial movements of the side plate 16 relative to the axis of rotation of the rotor 24 (FIG. 1), a periphery of the side plate 16 is contained axially between the rotor housing 18 and the side wall 14. In other words, the periphery of the side plate 16 is sandwiched between the side wall 14 and the rotor housing 18. A seal 70 is located at the periphery of the side plate 16 for limiting the combustion gases to leak out of the rotor cavity 20 and for limiting the cooling fluid from leaking into the combustion chamber 32 (FIG. 1). As shown more specifically in FIGS. 4-5, the seal 70 is contained within a groove 16B defined by the side plate 16. The seal 70 is described in detail below.

In a particular embodiment, the seal 70 and the abutment surface 14F of the side wall 14 allows the side plate 16 to move radially relative to the side wall 14. Such a movement, along a radial direction relative to the axis of rotation of the rotor 24, may be required in a configuration in which the side wall 14 is made of a material having a coefficient of thermal expansion different than that of the side plate 16 and/or because the different components may be exposed to different temperatures and, thus may exhibit different thermal expansion.

The side wall 14 further defines a pocket 14G that may circumferentially extend a full circumference of the side wall 14. In other words, the pocket 14G is annular. More than one pocket may be used. The pocket 14G may not cover an entirety of the center section 14B of the side wall 14. The pocket 14G is configured for circulating a liquid coolant, such as water for cooling the side plate 16. The pocket 14G may be part of the coolant circuit 12A and is in fluid flow communication with the coolant conduits 18B that are defined in the rotor housing 18. The pocket 14G extends from the surface 14E of the center section 14B and away from the rotor cavity 20. A depth D (FIG. 5) of the pocket 14G is defined by a distance along the axis of rotation of the rotor 24 between the surface 14E of the center section 14B and a bottom surface 14H of the pocket 14G.

Figure 2:
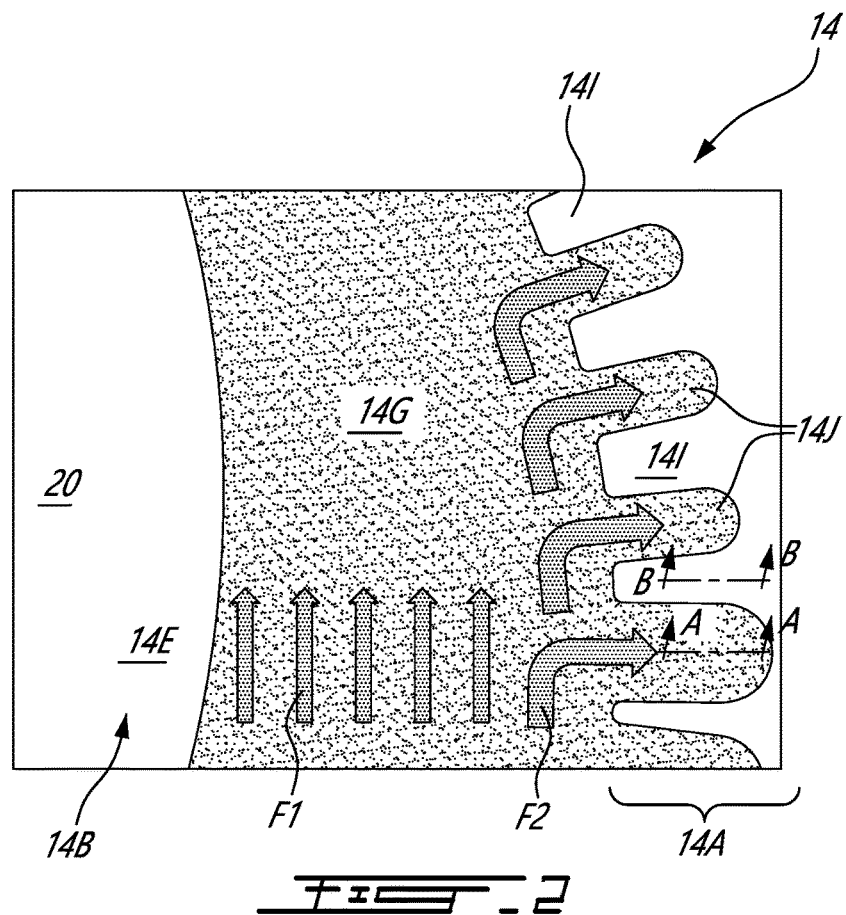
FIG. 2 is a fragmented top view of a side wall of a side housing of the rotary internal combustion engine of FIG. 1.
Figure 3:
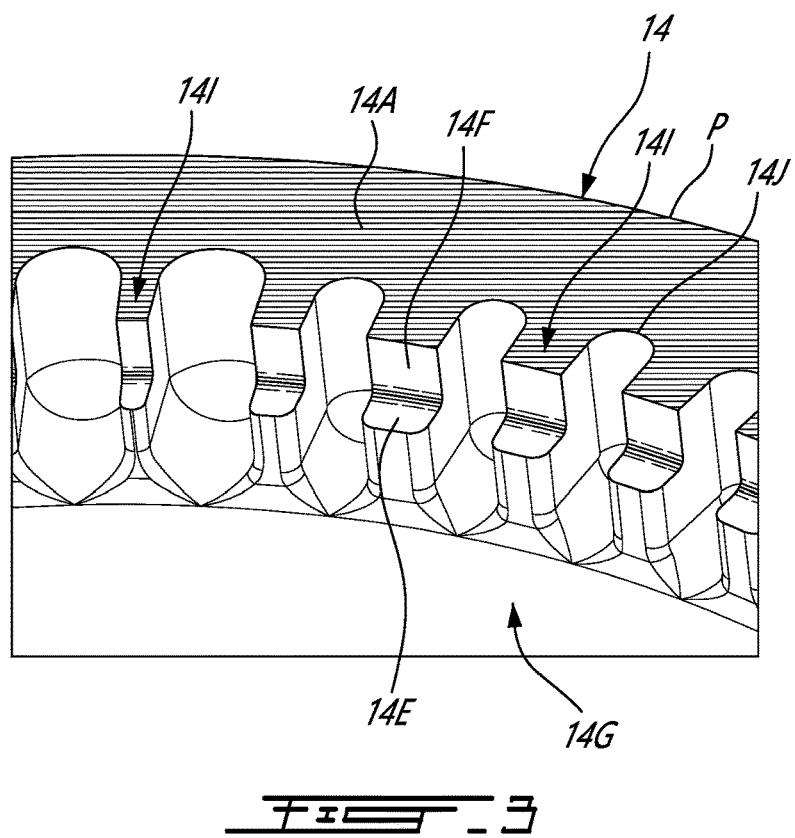
FIG. 3 is a fragmented three-dimensional view of the side housing of FIG. 2.

As shown in FIGS. 2-3, the peripheral section 14A of the side wall 14 defines a plurality of ribs 14I that are circumferentially distributed around the rotor cavity 20. The ribs 141 defines the abutment surface 14F and a portion of the surface 14E of the center section 14B of the side wall 14. Consequently, and in the depicted embodiment, the abutment surface 14F is defined by a plurality of surfaces defined by the ribs 141. The ribs 141 may be configured to support a pressure load imparted by a combustion of a mixture of air and fuel within the combustion chambers 32.

Cavities or spaces 14J are defined between the ribs 141. More specifically, each pair of two consecutive ones of the ribs 141 defines a space 14J therebetween. The spaces 14J are in fluid communication with the pocket 14G and with the coolant conduits 18B of the rotor housing 18. Stated otherwise, the coolant conduits 18B are in fluid communication with the pocket 14G via the spaces 14J between the ribs 141. The spaces 14J may allow the liquid coolant to flow from the pocket 14G to the coolant conduits 18B of the rotor housing 18. It is understood that the liquid coolant may be circulated in closed loop and through a heat exchanger. The heat exchanger may be used to dissipate heat to an environment outside the engine; the heat transferred from the engine to the liquid coolant.

Figure 5:
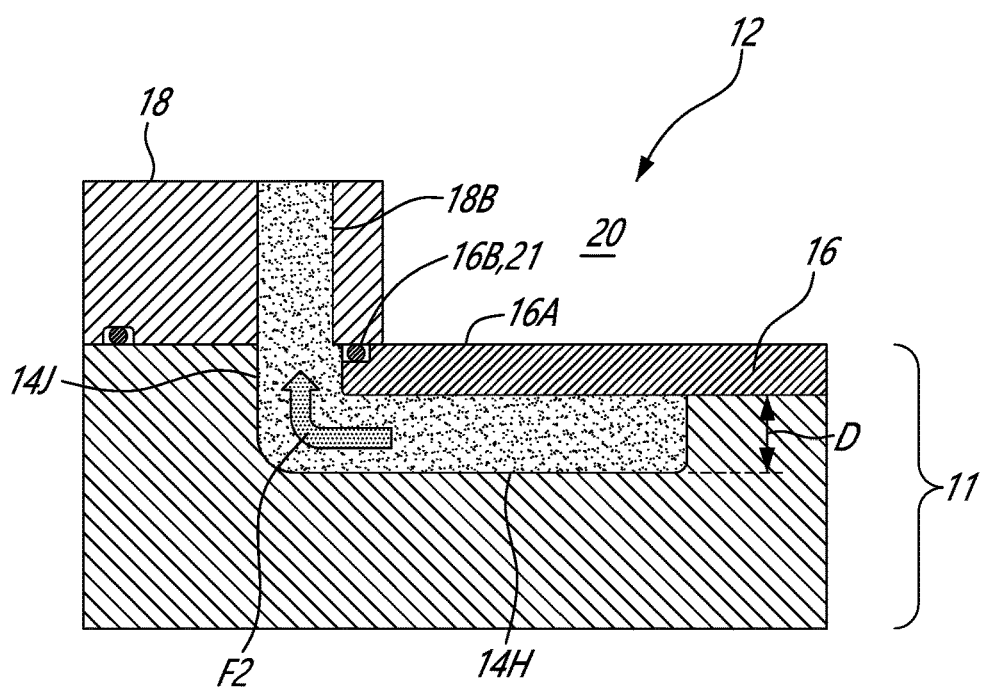
FIG. 5 is a cross-sectional view taken along line A-A of FIG. 2 in accordance with the embodiment of FIG. 4.

As shown in FIGS. 2 and 5, a flow F1 of the liquid coolant circulates within the pocket 14G. The flow F1 is divided in sub-flows F2; each of the sub-flows F2 circulating within a respective one of the spaces 14J and within a respective one of the coolant conduits 18B of the coolant circuit 12A. The liquid coolant may be circulated out of the housing assembly 12 and within a heat exchanger for extracting the heat. The liquid coolant may then be reinjected in the coolant circuit 12A for further heat extraction.

Figure 6:
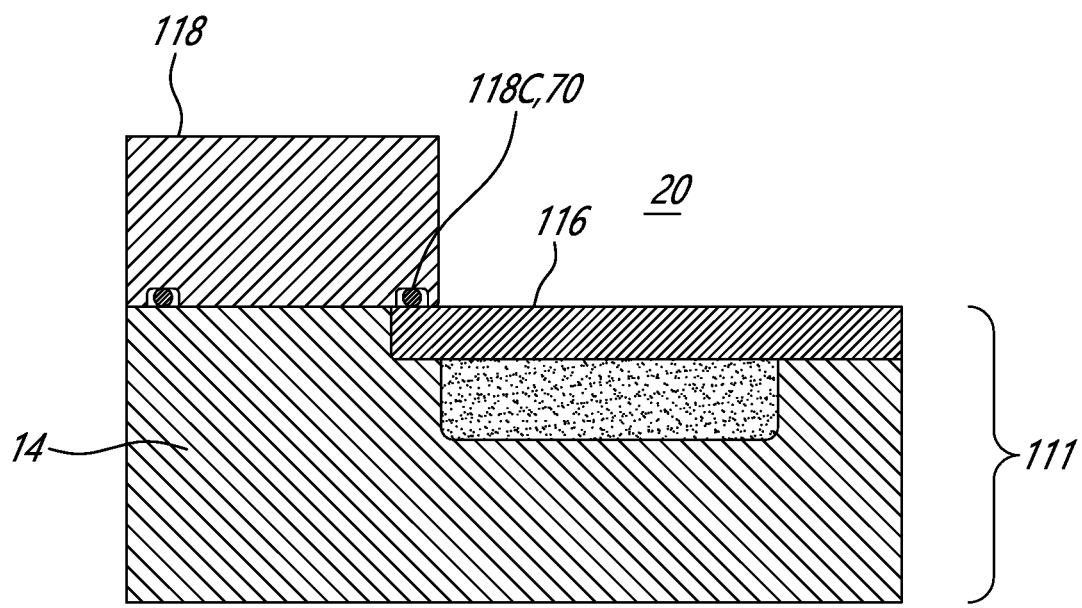
FIG. 6 is a cross-sectional view taken along line B-B of FIG. 2 in accordance with another embodiment.

Referring now to FIG. 6, another embodiment of the outer body, more specifically of the side housing 111 and rotor housing 118, is generally shown. For the sake of conciseness, only elements that differ from the housing assembly 12 of FIGS. 2-5 are described. In the embodiment shown, the rotor housing 118 defines a groove 118C that receives the seal 70.

The housings of these rotary internal combustion engines are subjected to high pressure and thermal loads while having to provide running surface for the rotor. These running surfaces may be required to remain flat and cool to provide optimal sealing and to be of sufficient hardness to minimize wear. A material of choice for the rotor housing and the side housings may be aluminum due to its light weight and high thermal conductivity. However, the running surface of the aluminum housing may not be sufficiently wear-resistant. When using soft material like standard aluminum, the surface between the side and rotor housing is subject to wear and fretting. It may be possible to alleviate this drawback by using a wear resistant aluminum, such as an aluminum-silicon-carbide alloy. However, such a material is difficult to machine.

Figure 7:
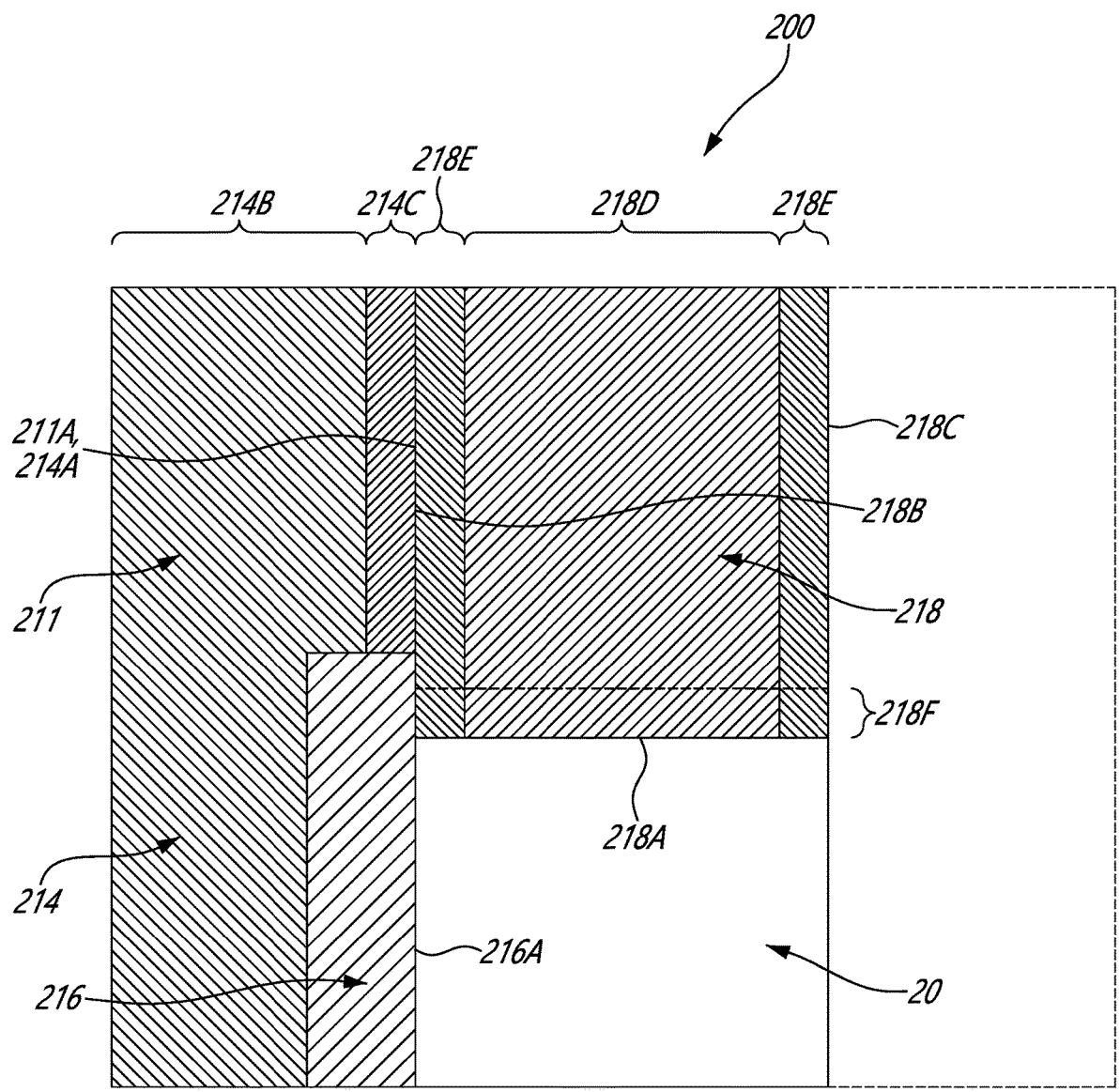
FIG. 7 is a cross-sectional view illustrating a housing assembly in accordance with one embodiment to be used with the rotary engine of FIG. 1.

Referring now to FIG. 7, a possible embodiment of a housing assembly at least partially alleviating the aforementioned drawbacks is shown at 200. The features described below with reference to FIG. 7 may be applied to any of the rotary internal combustion engines described in this disclosure.

As shown in FIG. 7, the rotor housing 218 has a peripheral inner face 218A facing the rotor cavity 20. The rotor housing 218 has a first face 218B at a first side and a second face 218C at a second side opposite to the first side. As previously described, a side housing 211 is secured to the first side of the rotor housing 218. Another side housing (an end housing or an intermediate housing), depicted in dashed lines in FIG. 7, is secured to the second side of the rotor housing 218. The side housing 211 defines an inner side face 211A that faces the rotor cavity 20 and the rotor housing 218. In this embodiment, the inner side face 211A is defined in part by a side wall 214 and in part by a side plate 216. The side plate 216, in this embodiment, is entirely made of silicon carbide. The side wall 214 therefore has a side face 214A in abutment with the first face 218B of the rotor housing 218. The side plate 216 has a rotor-engaging face 216A facing the rotor cavity 20. The second side housing, although depicted with a dashed line in FIG. 7, would have the same features as the side housing 211 described above. The rotor cavity 20 is therefore bounded axially between the two side housings.

In the embodiment shown, to at least partially alleviate the aforementioned drawbacks of the aluminum, the side wall 214 has a side main body 214B made of a base material, such as aluminum, and a side external layer 214C made of an external material. The side external layer 214C defines the side face 214A that is abutting the rotor housing 218. Also, the rotor housing 218 has a peripheral main body 218D made of the base material, and peripheral external layers 218E located on opposite sides of the peripheral main body 218D, and made of the external material. The peripheral external layers 218E define the first face 218B and the second face 218C of the rotor housing 218. In some embodiments, the rotor housing 218 may include a peripheral inner external layer 218F made of the external material. However, in some embodiments, the peripheral inner face 218A is preferably coated via thermal spray to resist abrasive wear with the apex seals of the rotor 24. The peripheral inner external layer 218F defines the peripheral inner face 218A of the rotor housing 218 and the surface against which the rotor 24 rides during operation. A thickness of the different external layers 214C, 218E, 218F may be about at least 0.003 inch. The thickness may be from about 0.001 inch to about 0.01 inch. In the context of the present disclosure, the expression "about" implies variations of plus or minus 10%. It will be appreciated that the external layer need not define an entirety of the different faces, but that only at least a part of those faces may be defined by the external layer in some embodiments.

A wear-resistance of the external material is greater than that of the base material. The expression "wear-resistance" may imply that a hardness of the external material is greater than a hardness of the base material. Wear-resistance as understood in the current disclosure refers to an ability of a material to resist wear either by friction with the rotor 24, by friction with the side housings 211, or any combinations of the above. In the depicted embodiment, the base material is aluminum and the external material is steel. However, in some embodiments, the external layer may be made of nickel, titanium, metal matrix composite (MMC), and so on. The base material may be magnesium in some embodiments. In some embodiments, a transition layer may be used between the base material and the external material. This transition layer may be used as a bonding "coat" to at least partially mitigate issues relating to thermal expansion mismatch.

The base material and the external material are dissimilar of one another. In the context of the present disclosure, the expression "dissimilar" when referring to materials implies materials that are difficult to join together, either because of their respective chemical composition or because of large differences in physical properties of these materials being joined. In other words, "dissimilar materials" refer to materials that are distinct or different from each other in terms of their composition, properties, or characteristics. These materials may have varying physical, chemical, or mechanical properties. The dissimilarity between materials affects their behavior when they come into contact or are used together in a system.

Figure 8:
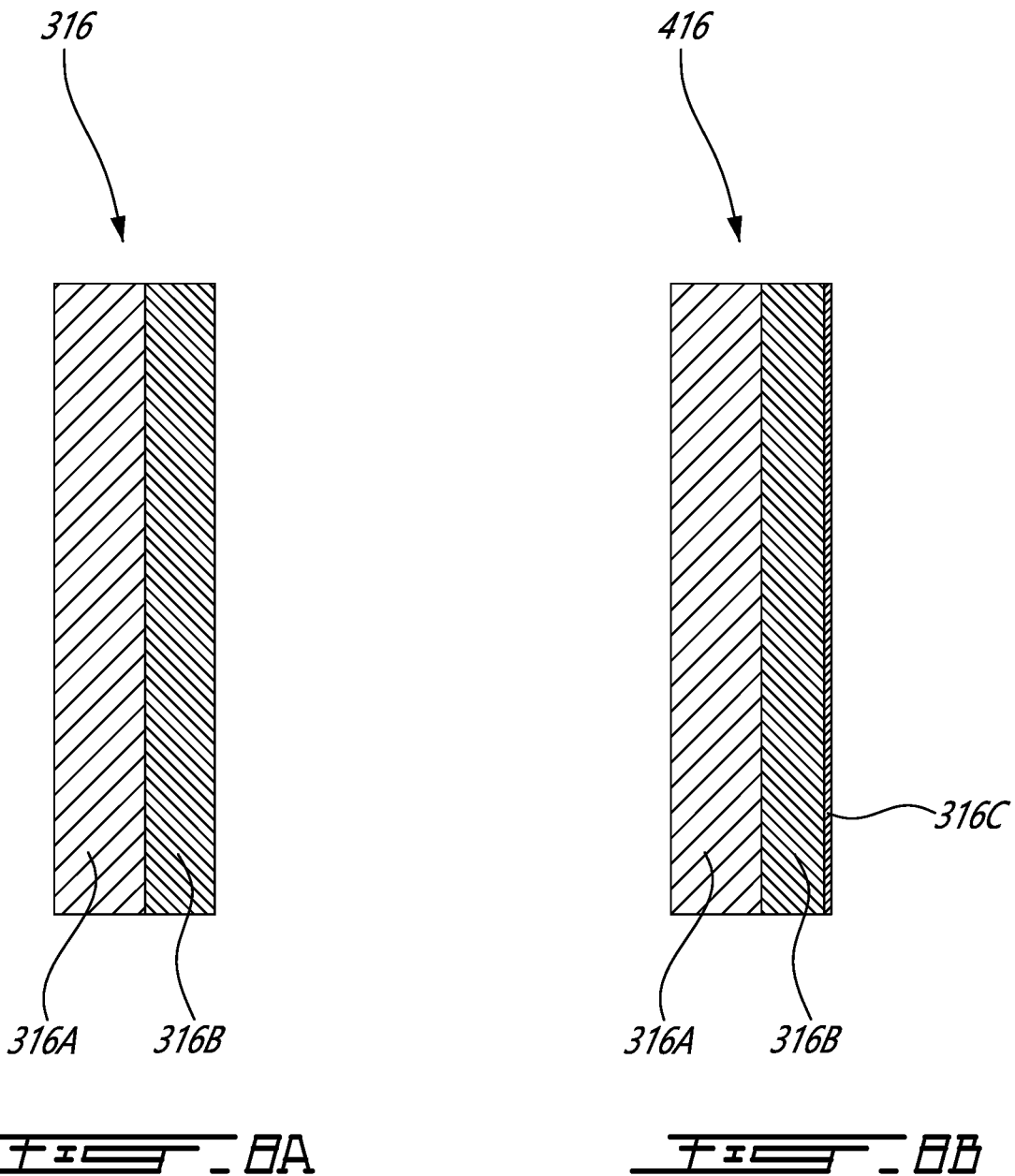
FIGS. 8A and 8B illustrate side views of possible embodiments of a side plate for the housing assembly of FIG. 7.

Referring now to FIGS. 8A and 8B, variations of the side plate are shown at 316 (FIG. 8A) and 416 (FIG. 8B).

In FIG. 8A, the side plate 316 includes a side plate main body 316A made of the base material and a side plate external layer 316B made of the external material. The side plate external layer 316B defines a rotor-engaging face that faces the rotor cavity 20 and that is contact with the rotor 24 during use.

In FIG. 8B, the side plate 416 is similar to the side plate 316 of FIG. 8A, but the rotor-engaging face has been treated with a surface treatment to improve properties of a portion 316C of the side plate external layer 316B; this portion defining the rotor-engaging face of the side plate 416. The surface treatment may include one or more of application of a hard coating (e.g., silicon carbide, nitriding, ceramic coating, etc) via thermal spraying (e.g., plasma spraying, high velocity oxygen fuel coating, air velocity air fuel coating, etc) or other methods, laser hardening, and shot peening. The portion 316C of the side plate external layer 316B may therefore either be made of the external material, or may correspond to a coating applied thereto.

Figure 9:
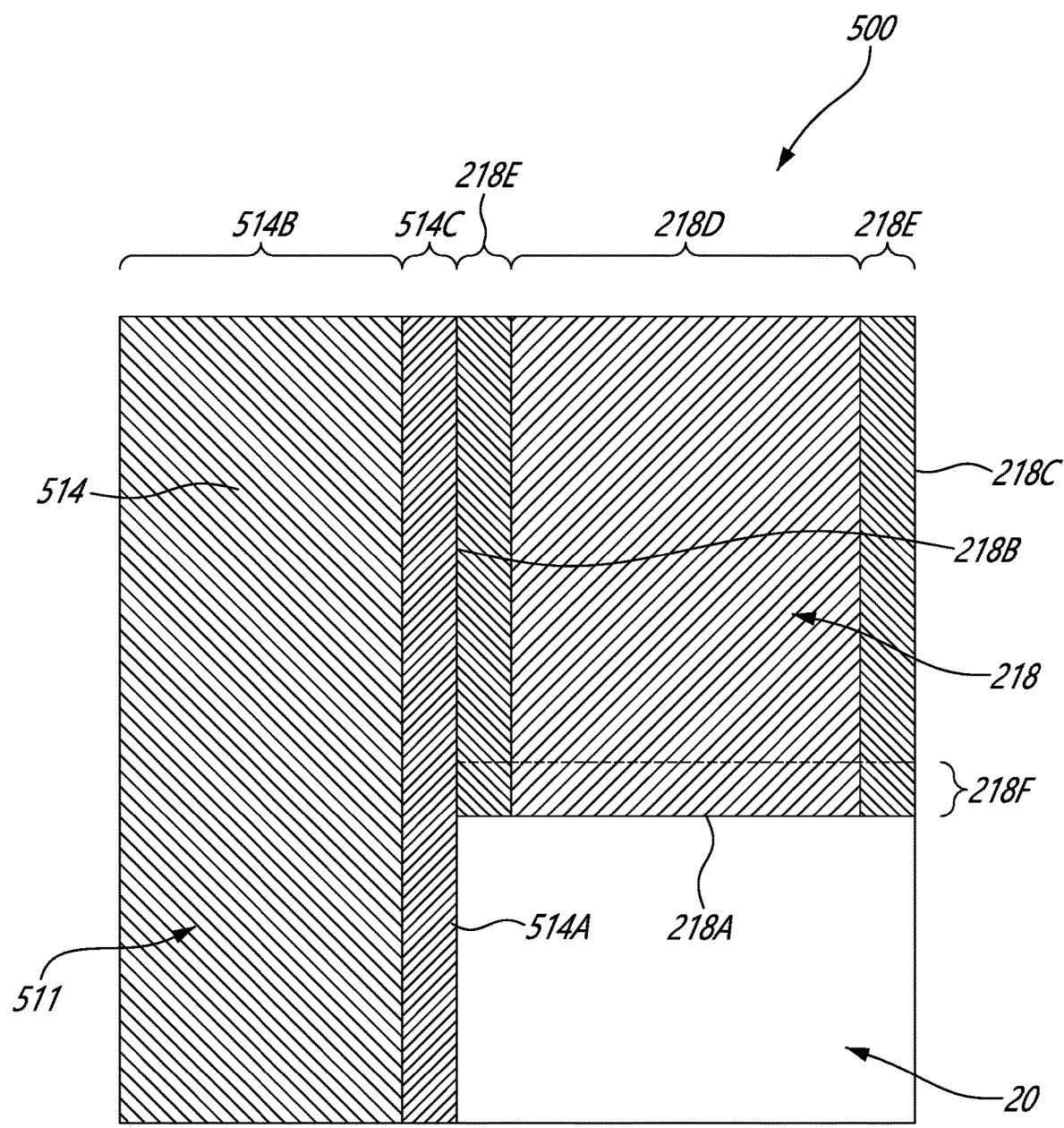
FIG. 9 is a cross-sectional view illustrating a housing assembly in accordance with another embodiment to be used with the rotary engine of FIG. 1.

Referring now to FIG. 9, another embodiment a housing assembly is shown at 500. For the sake of conciseness, only features differing from the housing assembly 200 described above with reference to FIG. 7 are described below.

In the depicted embodiment, the housing assembly 500 includes a side housing 511 including a side wall 514. The side housing 511 of this configuration does not include a separate and distinct side plate that defines a rotor-engaging face contacting the rotor 24 during operation. Such a configuration may include a casted side housing or a side housing manufacturing using additive manufacturing. The side wall 514 defines an inner side face 514A that has a peripheral section abutting the rotor housing 218 and a central section surrounded by the peripheral section and defining a rotor-engaging face contacting the rotor 24 during operation of the engine. The side wall 514 includes a side main body 514B made of the base material, and a side external layer 514C made of the external material.

Figure 10:
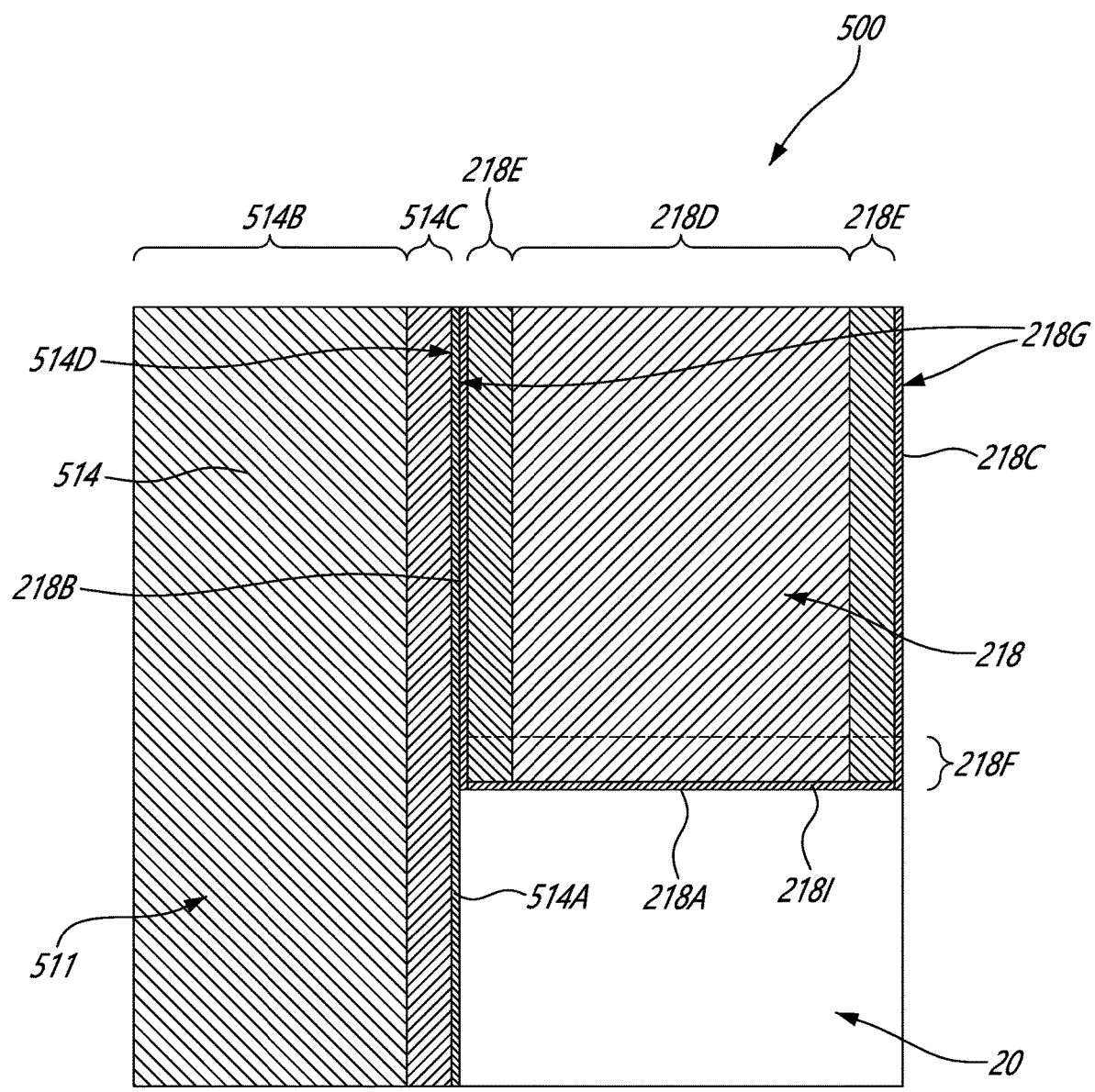
FIG. 10 is a cross-sectional view illustrating a housing assembly in accordance with yet another embodiment to be used with the rotary engine of FIG. 1.

Referring to FIG. 10, in some embodiments, it may be desired to increase hardness of outer faces or outer portions of the external layers to further increase wear-resistance. This may be done by performing a surface treatment. For instance, it may include subjecting the inner side face 514A to one or more of laser hardening, shot peening, and thermal spraying as explained above. Alternatively, or in combination, a side outer portion 514D of the side external layer 514C may be defined by a hard coating. The hard coating may be made of silicon carbide or any other suitable hard coating such as chromium carbide for instance. Similarly, the first face 218B and the second face 218C of the rotor housing 218 may be subjected to this surface treatment and/or coated with the hard coating. Hence, peripheral outer portions 218G of the rotor housing 218 at the first and second face 218B, 218C may be subjected to the surface treatment. Alternatively, or in combination, these peripheral outer portions 218G of the rotor housing 218 may be defined by the hard coating. Similarly, a portion 218I of the rotor housing 218 extending from the peripheral inner face 218A may also be subjected to the surface treatment and/or coated with the hard coating.

Referring now to FIG. 11, a method of manufacturing the housing assembly is shown at 1100. The method 1100 includes obtaining a main body of one or more of the rotor housing 218, and the two side housings 211, 511, the main body made of the base material at 1102; and adding a layer of the external material over the base material at 1104. The external material is dissimilar from the base material and the external material being more wear-resistant than the base material. The layer defines a face either contacting another one of the one or more of the rotor housing 218 and the two side housings 211, 511 or facing the rotor cavity 20.

The base material may be aluminum and the external material may be steel. The adding of the layer at 1104 includes adding the steel over the aluminum. The adding of the external material at 1104 includes adding the external material to the base material via ultrasonic additive manufacturing.

Ultrasonic additive manufacturing is a manufacturing method for building workpieces by fusing and stacking thin sheets of metal atop one another. Ultrasonic vibrations are used to remove an oxide layer separating the sheets. This allows them to fuse together. The process takes place at low temperatures and without melting the materials being fused. Ultrasonic additive manufacturing is a 3D printing process using ultrasonic energy to build up metal or composite structures, sheet by sheet. The process uses a sonotrode that that emits ultrasonic vibrations for bonding the sheet to a substrate. The sonotrode is displaced along the surface of the substrate and vibrates at an ultrasonic frequencies (e.g., about 20 kHz) to generate local heat at the interface between the sheet and the substrate. A roller may be used to press the sheet onto the substrate. Ultrasonic vibrations and pressure leads to bonding of the sheet on the substrate. The process is repeated sheet by sheet. Hence, when adding the external layer, the external layer may be added successively adding sheets of the external material, joining them to the substrate, and repeating the process. The second sheet of the external material is then joined to the already fused sheet of the external material The process is repeated until a thickness of the external layer reached the desired thickness, at least about 0.003 inch in this embodiment.

In some embodiments, it may be desired to further increase the hardness of the surface of the different housings. To do so, the method 1100 may include adding a coating over the external layer. The adding of the coating may include adding a coating of silicon carbide or other hard materials over the external layer. Alternatively, or in combination, a surface treatment may be performed to the external layer. The surface treatment may include one or more of laser hardening, shot peening (e.g., ultrasonic peening), and thermal spraying.

The obtaining of the main body at 1102 may include obtaining a side housing 211 of the two side housings. The side housing 211 includes a side wall 214 secured to the rotor housing 218 and a side plate 216. The peripheral section of the side plate 216 is disposed between the side wall 214 and the rotor housing 218. The adding of the external layer at 1104 may include adding the external layer on the side plate 216.

It will be appreciated that all of the features of the different housings, such as the passages of the coolant circuit 12A, the ribs 141 (FIG. 2), grooves for the seals, etc, are manufactured before the adding of the external layer at 1104. This may facilitate the manufacturing of these features since it may not be required to machine the harder material of the external layer. In some embodiments, these features may be machined on the thin sheets of the external material.

It is noted that various connections are set forth between elements in the preceding description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. The term "connected" or "coupled to" may therefore include both direct coupling (in which two elements that are coupled to each other contact each other) and indirect coupling (in which at least one additional element is located between the two elements).

It is further noted that various method or process steps for embodiments of the present disclosure are described in the following description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Furthermore, no element, component, or method step in the present disclosure is intended to be dedicated to the public regardless of whether the element, component, or method step is explicitly recited in the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. The use of the indefinite article "a" as used herein with reference to a particular element is intended to encompass "one or more" such elements, and similarly the use of the definite article "the" in reference to a particular element is not intended to exclude the possibility that multiple of such elements may be present.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A housing assembly for a rotary internal combustion engine, comprising:
   a rotor housing extending around an axis, the rotor housing having a peripheral inner face facing a rotor cavity, a first face at a first side and a second face at a second side opposite to the first side;
   a first side housing secured to the first side of the rotor housing, the first side housing defining a first inner side face facing the rotor cavity and the rotor housing, the first side housing including a side wall secured to the rotor housing and a side plate, a peripheral section of the side plate disposed between the side wall and the rotor housing; and
   a second side housing secured to the second side of the rotor housing, the second side housing defining a second inner side face facing the rotor cavity and the rotor housing, the rotor cavity bounded axially between the first side housing and the second side housing, one or more of the rotor housing, the first side housing, and the second side housing having:
   a main body made of a base material; and
   an external layer made of an external material, the base material and the external material being dissimilar to one another, a wear-resistance of the external material greater than that of the base material, the external layer defining at least a part of one or more of the first face of the rotor housing, the second face of the rotor housing, the peripheral inner face of the rotor housing, the first inner side face of the first side housing, and the second inner side face of the second side housing.

2. The housing assembly of claim 1, wherein the base material is aluminum and the external material is steel.

3. The housing assembly of claim 1, wherein a thickness of the external layer is at least about 0.003 inch.

4. The housing assembly of claim 1, comprising a coating disposed over the external layer, the coating including of one or more of silicon carbide, chromium carbide, aluminum nitride, and tungsten carbide.

5. The housing assembly of claim 1, wherein the side plate is made of silicon carbide, the first inner side face extending around the side plate and abutting the first face of the rotor housing.

6. The housing assembly of claim 5, wherein both of the first inner side face and the first face are defined by the external material.

7. The housing assembly of claim 1, wherein the side plate has a side plate main body made of the base material and a side plate external layer made of the external material.

8. The housing assembly of claim 7, comprising a coating disposed over the side plate external layer.

9. A rotary internal combustion engine including the housing assembly of claim 1 and a rotor received within the rotor cavity.

10. A method of manufacturing a housing assembly for a rotary internal combustion engine, the housing assembly having a rotor housing and two side housings secured to the rotor housing to define a rotor cavity, the method comprising:
    obtaining a main body of one or more of the rotor housing and the two side housings, the main body made of a base material; and
    adding a layer of an external material over the base material, the external material being dissimilar from the base material, the external material being more wear-resistant than the base material, the layer defining a face either contacting another one of the one or more of the rotor housing and the two side housings or facing the rotor cavity, the adding of the external material including adding the external material to the base material via ultrasonic additive manufacturing.

11. The method of claim 10, wherein the base material is aluminum and the external material is steel, the adding of the layer of the external material includes adding the steel over the aluminum.

12. The method of claim 10, comprising adding a coating over the external layer.

13. The method of claim 12, wherein the adding of the coating includes adding a coating of one or more of silicon carbide, chromium carbide, aluminum nitride, and tungsten carbide, over the external layer.

14. The method of claim 10, comprising applying a surface treatment to the external layer.

15. The method of claim 14, wherein the applying of the surface treatment includes performing one or more of laser hardening, shot peening, and thermal spraying.

16. The method of claim 10, wherein the obtaining of the main body includes obtaining a side housing of the two side housings, the side housing including a side wall secured to the rotor housing and a side plate, a peripheral section of the side plate disposed between the side wall and the rotor housing.

17. The method of claim 16, wherein the adding of the external layer includes adding the external layer on the side plate.

18. A housing assembly for a rotary internal combustion engine, comprising:
- a rotor housing extending around an axis, the rotor housing having a peripheral inner face facing a rotor cavity, a first face at a first side and a second face at a second side opposite to the first side;
- a first side housing secured to the first side of the rotor housing, the first side housing defining a first inner side face facing the rotor cavity and the rotor housing; and
- a second side housing secured to the second side of the rotor housing, the second side housing defining a second inner side face facing the rotor cavity and the rotor housing, the rotor cavity bounded axially between the first side housing and the second side housing,
- one or more of the rotor housing, the first side housing, and the second side housing having:
- a main body made of a base material; and
- an external layer made of an external material, the base material and the external material being dissimilar to one another, a wear-resistance of the external material greater than that of the base material, the external layer defining at least a part of one or more of the first face of the rotor housing, the second face of the rotor housing, the peripheral inner face of the rotor housing, the first inner side face of the first side housing, and the second inner side face of the second side housing, the external layer overlapping an interface between the rotor housing and the first side housing.

* * * * *